Feb. 4, 1930. C. J. SMITH ET AL 1,746,017
AIRPLANE BRAKE
Filed Dec. 27, 1926 2 Sheets-Sheet 2

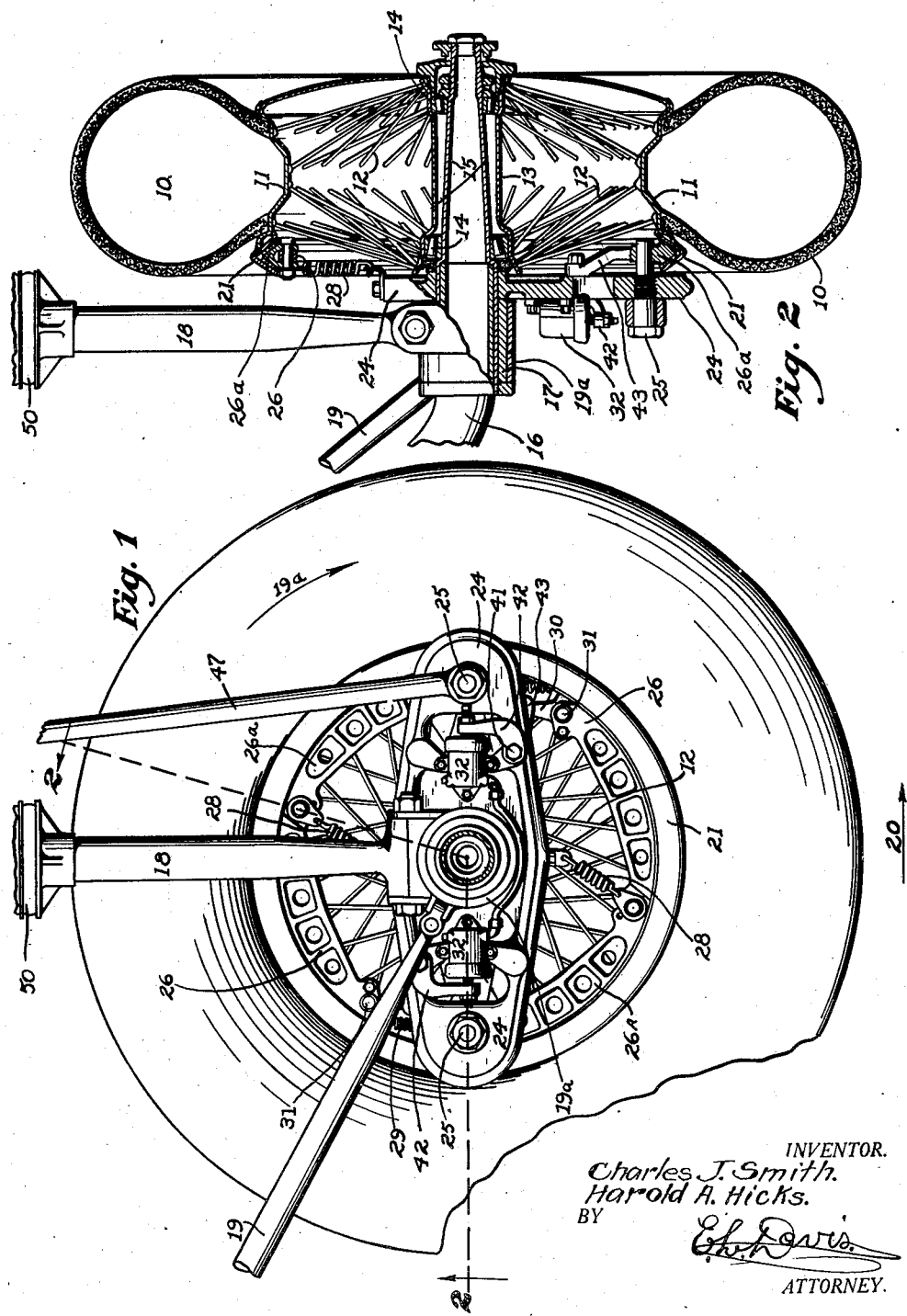

INVENTOR.
Charles J. Smith
Harold A. Hicks.
BY
ATTORNEY.

Patented Feb. 4, 1930

1,746,017

UNITED STATES PATENT OFFICE

CHARLES J. SMITH, OF DEARBORN, AND HAROLD A. HICKS, OF DETROIT, MICHIGAN, ASSIGNORS TO FORD MOTOR COMPANY, OF DETROIT, MICHIGAN

AIRPLANE BRAKE

Application filed December 27, 1926. Serial No. 157,338.

The object of our invention is to provide an airplane brake of simple, durable and inexpensive construction.

A further object of our invention is to provide a brake for an airplane having a minimum wind resistance, and to secure this object by disposing the brake, as far as possible, within the lines of the tire used on the wheel and to provide an internal brake so that the parts may be enclosed as much as possible.

Still a further object of our invention is to provide an airplane brake wherein almost the whole torque on the brake supporting bracket caused by the braking action may be taken up by a tension member which extends from the forward part of the said bracket to the fuselage or wing, thereby making it unnecessary to add further rods or braces to take this torque.

Still a further object of our invention is to provide an airplane brake which is as far as possible self-energizing throughout its length.

Still a further object of our invention is to provide a double set of brakes for each wheel to thereby insure reliability and also to secure the maximum self-energizing effect.

Still a further object of our invention is to provide a brake member which may co-act with an extension of the rim which carries the tire to thereby minimize the parts necessary for the installation of the brake and to relieve the spokes of the wheel of all torsional strain caused by the braking action.

With these and other objects in view our invention consists in the arrangement, construction and combination of the various parts of our improved device as described in the specification, claimed in the claims and illustrated in the accompanying drawings in which:—

Fig. 1 shows a side elevation of an airplane wheel, having our improved brake applied thereto.

Fig. 2 shows a sectional view taken on the line 2—2 of Fig. 1.

Figure 3:
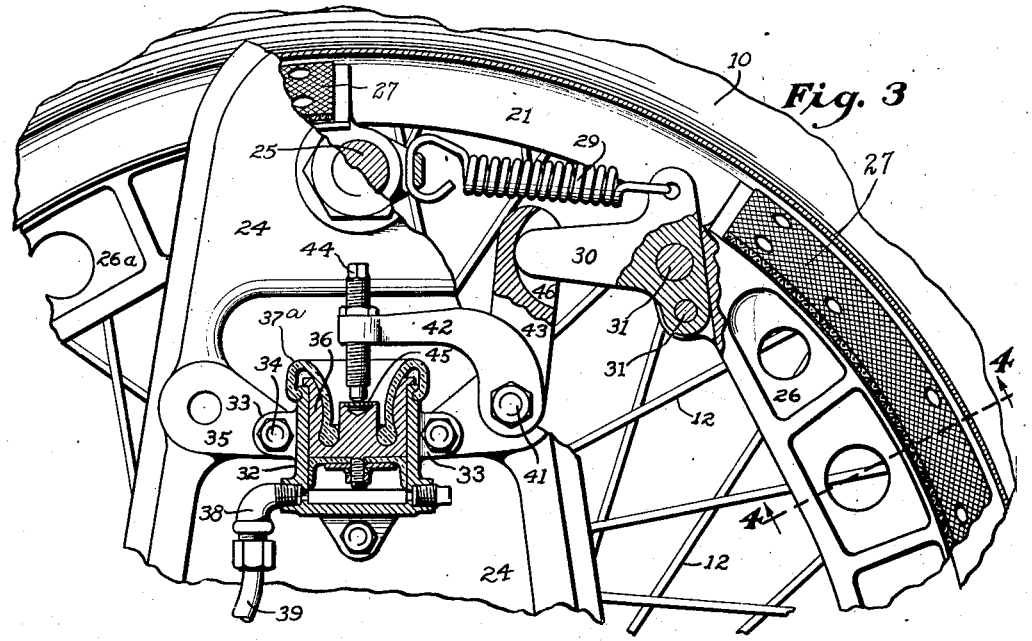
Fig. 3 shows an enlarged detail view of one of the brake operating mechanisms, parts being broken away to better illustrate the construction.
Figure 4:
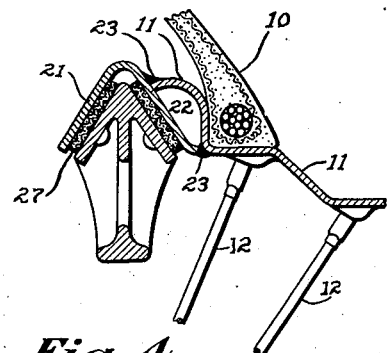
Fig. 4 shows an enlarged detailed vertical sectional view taken on line 4—4 of Fig. 3 illustrating the construction of the combined brake drum and rim used in connection with our improved brake.
Figure 5:
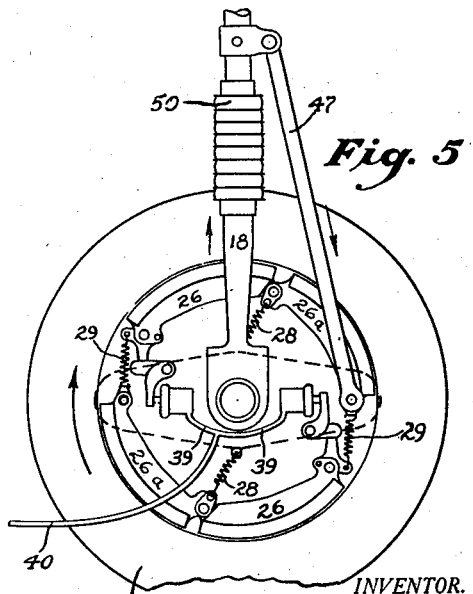
Fig. 5 shows a diagrammatic view illustrating the manner of absorbing the torque due to the operation of the brake when the wheel is rotating.

Referring to the accompanying drawings, we have used a reference numeral 10 to indicate generally the tire usually provided in connection with an airplane wheel, this tire being mounted on a rim 11 which may be of an approved cross section to properly hold the tire 10 thereon. The rim 11 is connected by a plurality of spokes 12 with hub member 13. This hub member 13 is journalled by means of a pair of adjacent roller bearings 14 onto a stub shaft 15 which in turn is secured to the outer end of a diagonal strut 16. A sleeve 17 is rigidly mounted on the inner end of stub shaft 15 and forms part of the lower end of a vertical thrust receiving strut 18 which is designed to be secured to the fuselage or wings of an airplane in any suitable manner. Strut 18 has a shock absorbing device 50 or spring located therein so that the wheel may move upwardly when an obstruction is encountered to thereby relieve the airplane of the sudden shocks and jolts ordinarily produced in the wheels when an airplane is landing or starting.

This sleeve 17 is further supported from the airplane fuselage by the compression rod 19 which is fastened to ring 19ª which in turn is mounted on sleeve 17 and held from rotation thereon, so that the lower end of the thrust strut 18 will not move rearwardly when the airplane is moved in the direction of the arrow 20 shown in Fig. 1. The lateral swinging of the wheel relative to the fuselage is permitted by flexible mountings on the upper end of the diagonal strut 16 where it fastens onto the fuselage and on the upper end of the vertical compression strut 18 where it joins onto the wing. The vertical strut 18 is pivoted at its lower end adjacent to sleeve 17 so as to relieve the strut of any bending strains which would be caused by a lateral movement of the wheel 10.

From the foregoing it will be noted that sleeve 17 is mounted rigidly in both ring 19ª and the lower end of strut 18 but is rotatably mounted on the stub shaft 15 which is secured to the strut 16. This arrangement is necessary to relieve the struts of all bending strains so that they act solely as compression or tension members which is one of the objects of our invention.

The rim 11 adjacent to one edge thereof has a V cross section brake drum member 21 of circular or ring shape welded thereto, the parts being so arranged that there is preferably an air space 22 between the brake drum 21 and the adjacent portion of the rim 11 so that heat generated by the braking action against drum 21 will not be transferred to the rim 11 sufficiently to injure the adjacent portion of the tire 10. This brake drum 21 may be secured to the edge of the rim 11 by a pair of line welds 23 if desired.

It being very desirable to lessen the air resistance of the exposed parts of an airplane, the brake drum member 21 is secured to the rim 11 so as to lie within the lines of the tire 10, that is, within the area formed by the vertical planes of each side of the tire intersecting the circular planes corresponding to the inner and outer circumferences of the tire, respectively. The air resistance offered by the combined tire wheel and brake drum will, therefore, be no greater than that offered by the tire and wheel alone. A further reason for placing the rim 21 within the lines of the tire 10 is to protect the brake drum member 21 by means of the tire. This structure is especially adapted for airplane use because all obstructions encountered by the landing gear of the airplane are effectively warded off by the tire to protect the brake drum and brake mechanism from damage.

Rotatably mounted on sleeve 16 is a brake supporting member 24 which is generally of oval shape. We have designated the two shoes of each brake as primary shoe 26 and secondary shoe 26ª which are generally of semicircular shape and have their brake surfaces shaped to correspond with brake drum 21. Secondary shoes 26ª are pivoted at 25 to each end of the brake supporting member 24. The outer surfaces of the brake shoes 26 and 26ª are preferably provided with suitable linings 27, which may be secured in place in any of the well known ways by which such linings are mounted.

The secondary shoes 26ª are normally yieldingly urged out of engagement with brake drum 21 by a pair of coil springs 28. The free end of the secondary shoes 26ª are pivoted to the adjacent ends of primary shoes 26, the other end of shoes 26 being urged out of contact with the brake drum and against the operating arm by springs 29 acting between the pivot 25 of the opposite set of brakes and wear plate 30 which is fastened to the free end of the primary shoe 26 in any suitable manner as by means of rivets 31.

The brake supporting member 24 is provided between the sleeve 16 and the pivots 25 with a pair of recesses designed to receive hydraulic brake operating cylinders 32. The cylinders are provided with ears 33 which are bolted or otherwise secured as at 34 to lugs 35 formed as part of the brake supporting member 24. These cylinders 32 are preferably made of aluminum and are provided with an aluminum piston 36, having a washer 37ª at the inner end thereto of flexible material which is designed to co-act with cylinder 32 to form a liquid tight slide joint therewith. The outer surface of piston 36 is preferably connected to the outer end of the cylinder 32 by a flexible tube 37 so that any oil which may leak up between piston 36 and cylinder 32 will be caught by this flexible tube 37, which forms an apron to prevent the leakage of oil.

The closed end of the cylinder 32 is connected by a suitable elbow 38 with an oil pressure line 39, which in turn is connected with a main oil pressure line 40, the latter being extended to a manually controlled pressure creating device which is disposed in the fuselage of the airplane so that the operator may create a pressure in the pressure line 40 to thereby operate the cylinders which actuate my improved brake device.

The brake supporting member 24 is provided adjacent to each hydraulic cylinder with a pivot device 41 upon which a bell crank lever having arms 42 and 43 may be mounted. The arm 42 has an adjusting screw 44 mounted in the free end thereto in position to bear against a steel wear plate 45 on the top of piston 36. The second arm 43 of the bell crank lever is notched at 46 to receive the end of the wear plate 30 on the adjacent brake shoe 26.

By referring to Fig. 3 it will be quite clear that the spring 29 will tend to draw the wear plate 30 against the arm 43 of the bell crank referred to thereby causing second arm 42 to bear against the piston 36 and thereby forcing the piston into the hydraulic cylinder. At the same time the spring pressure from springs 28 and 29 will tend to disengage both the brake shoes 26 and 26ª from the brake drum 21. If however, a pressure be applied in the pressure line 39 then the piston 36 will be forced out of the cylinder 32 thereby swinging arms 42 and 43 of the bell crank lever to force the brake shoes 26 and 26ª into engagement with the brake drum 21 to thereby render the brake effective to retard the rotation of the airplane wheel.

By referring to Fig. 1 it will be noted that the foreward movement of the airplane in the direction of the arrow 20 will cause a rotation of the wheel in the direction of the arrow 19ª. The reaction caused by applying the brakes tends to rotate member 24 in the direction of arrow 19ª.

A tension rod 47 has its lower end connected to the forward pivot 25 and its upper end connected to a portion of the fuselage, wing or to the upper section of the compression strut 18 above the shock absorbing member 50. As this tension rod 47 is connected to the forward pivot 25 it will be seen that the brake reaction will be taken wholly by tension on the rod 47 and compression on the strut 18 and that the torsional strain normally caused by the brake action on the struts 16 and 19 will thereby be eliminated.

The forward motion of the airplane causes the brake drum to revolve in the direction of arrow 19ª and if the brake is applied during this rotation the drum will tend to wedge the shoe tighter against itself thereby producing a self-energizing brake action which is desirable where a heavy load must be stopped.

Among the many advantages arising from the use of our airplane brake construction, it should be specially pointed out that the struts 16, 18 and 19 are those ordinarily provided in connection with the mounting wheels on airplanes so that the only additional connection of the fuselage or wing required to take up the brake reaction is the tension rod 47 which is of course of relatively light weight. A further advantage results from the fact that we use an internal brake so that wind resistance is cut down, and so that this brake may be disposed largely within the lines of the tire used on the airplane wheel. A further advantage results from the dually operable brake shoes in reliability of operation, and in securing the maximum advantage from the self-energizing of the brake members. Further, the use of a hydraulic brake enables me to eliminate complicated mechanical items, which would be necessary in view of the fact that the two wheels operate independently of each other and have no common axle.

Some changes may be made in the arrangement and construction of the various parts of our improved device without departing from the spirit of our invention, and it is our intention to cover by our claims such changes as may reasonably be included within the scope thereof.

We claim as our invention:

1. In an airplane brake, a shaft, a wheel rotatably mounted thereon, a brake drum mounted on said wheel, a compression strut journaled concentrically on said shaft, and a brake holding member similarly mounted on said shaft, a brake member mounted on said brake holding member and adapted to coact with the brake drum, and a tension rod connected to one end of the said brake holding member.

2. In an airplane brake construction, a shaft, a wheel including a tire and rim rotatably mounted on said shaft, a brake drum mounted on said rim and forming an extension thereof, a brake holding member journaled concentrically on said shaft, a compression strut journaled concentrically on said shaft and extended upwardly therefrom, a tension rod secured to the forward end of the brake holding member and extended upward therefrom, and brake members mounted on said brake holding member in a position to co-act with the brake drum, the parts being so constructed that the brake action will cause compression on the compression strut, and tension on the tension rod.

3. In an airplane brake construction, a shaft, a wheel having a rim and tire associated therewith mounted for rotation on said shaft, a V cross section ring shaped brake drum secured to and extended from said rim substantially within the lines of said tire, a brake supporting member mounted on said shaft, brake members mounted on said brake supporting means in a position to co-act with said brake drum, the brake members having their braking surface shaped to co-act with the braking surface of the brake drums and means mounted on said brake supporting member, for operating said brake members.

4. In an airplane brake, a shaft, a wheel rotatably mounted thereon, a brake drum mounted on said wheel, a compressible strut rotatably mounted on said shaft, a brake holding member secured to said shaft, a brake member mounted on said brake holding member and adapted to co-act with the brake drum, and a tension rod pivotally connected to one end of the said brake holding member.

5. In an airplane brake device, a shaft, a wheel including a tire and rim rotatably mounted on said shaft, a brake drum supported by the rim within the lines of the tire, a brake supporting member journaled on said shaft, brake members independently mounted on said brake supporting member on either side of said shaft, in position to co-act with said brake drum, and similarly mounted hydraulically actuated operating members independently connected to the brake members to actuate same.

6. In a device of the character described, an airplane wheel and brake assembly comprising a shaft, a wheel journaled on said shaft, a brake mechanism mounted on said shaft, the rim for said wheel being of generally channel section, a brake drum welded to one edge of said rim, by a pair of circumferential line welds, the parts being so shaped that there is a dead air space between the major part of the adjacent portions of the brake drum and rim and the brake drum being disposed in position to co-act with said brake mechanism.

7. In an airplane brake device, a shaft, a wheel including a tire and rim rotatably mounted on said shaft, a brake drum supported by the rim within the lines of the tire, a brake member journalled on said shaft, brake members independently mounted on said brake supporting member on either side of said shaft in position to co-act with said brake drum, an actuating member for each of said brake members, and a common means for operating both of said actuating members simultaneously, the parts being so arranged that said pair of operating members and brake members will have no common parts.

CHARLES J. SMITH.
HAROLD A. HICKS.